(12) United States Patent
Sekida

(10) Patent No.: US 7,540,562 B2
(45) Date of Patent: Jun. 2, 2009

(54) SEAT BACK STRUCTURE OF VEHICLE SEAT

(75) Inventor: Isao Sekida, Tokyo (JP)

(73) Assignee: Tachi-S Co., Ltd., Tokyo (JP)

( * ) Notice: Subject to any disclaimer, the term of this patent is extended or adjusted under 35 U.S.C. 154(b) by 0 days.

(21) Appl. No.: 11/764,955

(22) Filed: Jun. 19, 2007

(65) Prior Publication Data

US 2008/0012402 A1 Jan. 17, 2008

(30) Foreign Application Priority Data

Jul. 13, 2006 (JP) .............................. 2006-192397

(51) Int. Cl.
*B60N 2/42* (2006.01)
*B60N 2/427* (2006.01)
*B60N 2/48* (2006.01)
*B60R 21/00* (2006.01)

(52) U.S. Cl. ............................................. 297/216.12

(58) Field of Classification Search ............. 297/216.12
See application file for complete search history.

(56) References Cited

U.S. PATENT DOCUMENTS

| | | | | |
|---|---|---|---|---|
| 6,019,424 A | * | 2/2000 | Ruckert et al. | 297/216.12 |
| 6,135,561 A | * | 10/2000 | Kruger et al. | 297/216.12 X |
| 6,199,947 B1 | * | 3/2001 | Wiklund | 297/216.12 |
| 6,354,659 B1 | * | 3/2002 | Andersson et al. | 297/216.12 X |
| 6,604,788 B1 | * | 8/2003 | Humer | 297/216.12 X |
| 6,631,949 B2 | * | 10/2003 | Humer et al. | 297/216.12 |
| 6,631,955 B2 | * | 10/2003 | Humer et al. | 297/216.12 X |
| 6,655,733 B2 | * | 12/2003 | Humer et al. | 297/216.12 |
| 6,789,846 B2 | * | 9/2004 | Humer et al. | 297/216.12 |
| 7,017,989 B2 | * | 3/2006 | Yamaguchi et al. | 297/216.12 |
| 7,284,794 B2 | * | 10/2007 | Yamaguchi et al. | 297/216.12 |
| 2008/0088158 A1 | * | 4/2008 | Yokota et al. | 297/216.12 |

\* cited by examiner

*Primary Examiner*—Rodney B White
(74) *Attorney, Agent, or Firm*—Browdy and Neimark, P.L.L.C.

(57) ABSTRACT

A seat back structure with headrest includes a vertical pressure-receiving element and cross pressure-receiving element. The headrest is fixed on a support rod operatively connected via a rotating link with an actuator link assembly. The vertical pressure-receiving element, upon one load being applied thereto from a seat occupant's lumber part, is displaced backwardly and upwardly via guide hole to push the support rod, thereby causing commencement of rotation of the rotating links to move the headrest upwardly. Thereafter, the cross pressure-receiving element, connected with the actuator link assembly, is displaced backwardly, upon another load being applied thereto from a seat occupant's dorsal part, thereby assisting in continuation of the rotation of rotating link.

5 Claims, 4 Drawing Sheets

FIG. 1
FIG. 2
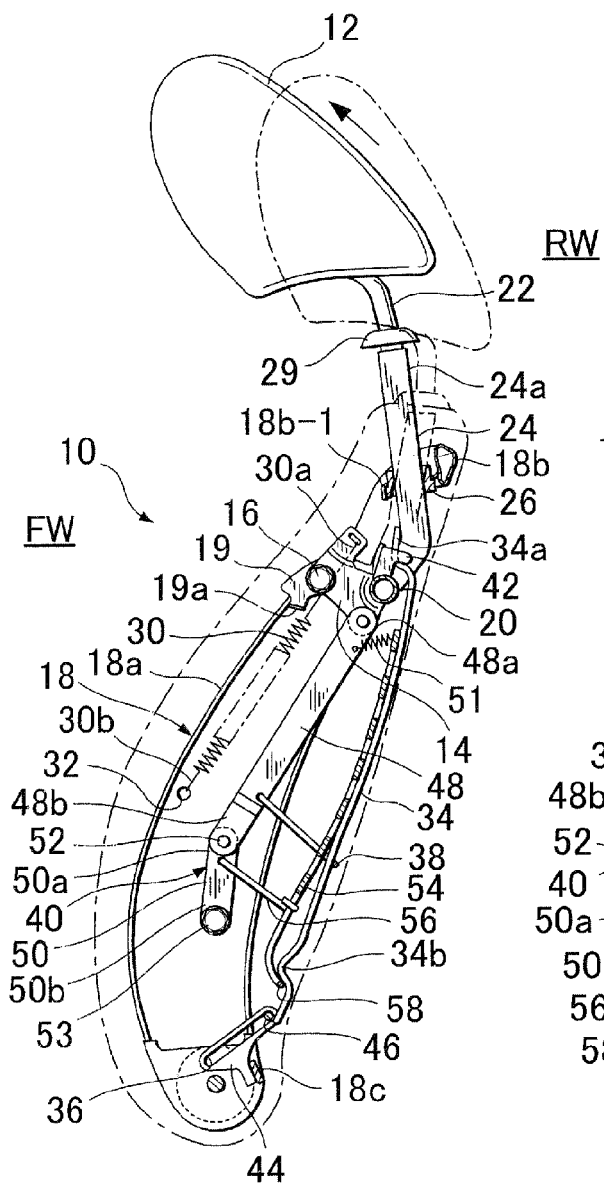
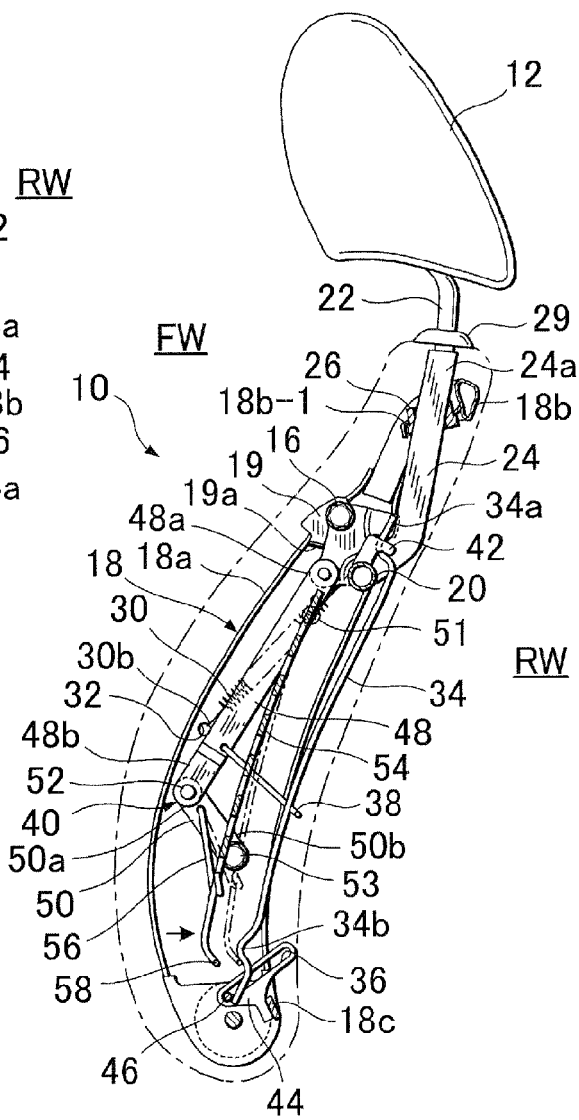

SEAT BACK STRUCTURE OF VEHICLE SEAT

BACKGROUND

1. Field of the Invention

The present invention relates to a seat back structure of vehicle seat provided with a movable headrest. In particular, the invention is directed to a seat back structure of vehicle seat of the type comprising a headrest movably provided on the seat back and a pressure receiving element provided in the seat back and operatively connected with the headrest, with the arrangement thereof being such that, when a rear-end collision occurs and a backward load is applied from a seat occupant to the pressure receiving element under a backward inertia of that seat occupant, the headrest is forcibly displaced forwardly and upwardly toward a point adjacent to a head of the seat occupant.

2. Description of Prior Art

Disclosed and known for example from the Japanese Laid-Open Patent Publication No. 11-34708 is a seat back structure of the foregoing kind which is designed for protecting a seat occupant's head against a rear-end collision. In brief, in the case of rear-end collision, the body of seat occupant is naturally displaced backwardly of the seat under a backward initial of the seat occupant, which in turn applies a corresponding load (or impact load) to a given pressure receiving element provided in the seat back. At this moment, with that pressure receiving element being moved backwardly, a headrest is forcibly at once displaced forwardly and upwardly to a point adjacent to a head of the seat occupant.

According to this kind of emergency active headrest, a biasing means, or a tension spring for example, is provided between the pressure receiving element and the headrest. Normally, the headrest is biasingly retained by such biasing means toward a lower home position where it receives a head of seat occupant in an ordinary manner. The biasing means in this headrest system, or the tension spring for example, has a predetermined biasing force sufficient to withstand a weight of the seat occupant's upper body portion as well as a normal load applied from that upper body portion, unless an impact load is applied thereto in a rear-end collision case by a greater force than the seat occupant's upper body portion weight and the normal load. Hence, only when such great impact load is applied to the seat back, the pressure receiving element is moved backwardly against the biasing force of the tension spring, so that the headrest is displaced from the lower headrest home position in forward and upward directions towards a predetermined upwardly displaced point of headrest.

With such arrangement, when the rear-end collision occurs, the headrest is quickly displaced toward a head of seat occupant being concurrently displaced forwardly, thereby insuring to keep a smallest possible space between the seat occupant's head and headrest, and therefore it is possible to effectively reduce a degree of subsequent backward inclination of the seat occupant's head, wherein such subsequent backward inclination of seat occupant's head is quickly followed by forward displacement of that particular head under a backward inertia of the seat occupant, as is known. Accordingly, in this prior art, an abrupt backward inclination of the seat occupant's head can be prevented assuredly, and it is possible to minimize injury of his or her neck portion or whiplash injury.

In the above-described known headrest system, the pressure receiving element, adapted for receiving an impact load caused by backward inertia of the seat occupant as stated above, is disposed at a point corresponding to a dorsal part of the seat occupant.

In general, when a seat occupant assumes normal seating posture on a seat, his or her lumbar part is in a substantially full contact with the surface of seat back, while by contrast, his or her dorsal part is in most cases positioned away from the seat back a certain distance. Thus, under a backward inertia of the seat occupant in the case of actual rear-end collision, the dorsal part of the seat occupant has to move backwards a distance corresponding to the afore-said certain distance between the seat back and that particular seat occupant's dorsal part, and then reach the pressure receiving element, at which moment, the pressure receiving element is pressed by that backwardly moved seat occupant's dorsal part and forcibly moved backwardly to cause forward and upward displacement of the headrest. This means that, upon occurrence of the rear-end collision, the seat occupant's dorsal part is moved backwardly the aforementioned distance and struck against the pressure receiving element. Consequently, it is more likely than not that the seat occupant's dorsal part might be suffered from or damaged by an excessive impact, due to its being strongly struck against the pressure receiving portion, which leaves a problem in this kind of active headrest system.

An example of solution to this problem is found in the Japanese Laid-Open Patent Publication No. 2000-325179 which teaches such head protection arrangement that, in a rear-end collision case, upon a seat occupant's lumbar part being pressed against a pressure receiving element, a headrest is immediately displaced upwardly to receive a head of the occupant.

This prior-art arrangement is indeed effective in view of the foregoing statement that the seat occupant's lumbar part is in a substantially full contact with the surface of seat back at the time when the seat occupant assumes normal seating posture on a seat. In other words, in the case of rear-end collision, such arrangement does not require undesired long moving distance of the lumbar part towards the pressure receiving element in the seat back, but permits that lumbar part to quickly reach and push the pressure receiving element. Hence, this lumbar active type of head projection system insures to lessen an impact applied from the pressure receiving element to the seat occupant's lumbar part.

In this sort of head protection system, a biasing means is provided to give a predetermined biasing force to both of the headrest and pressure receiving element, and generally stated, the biasing force is always imposed and active on all operative elements which are to be moved with every movement of the headrest, including that particular pressure receiving element and headrest. Consequently, in the rear-end collision case, it is necessary that a pressure overcoming such biasing force be continuously applied from the seat occupant's lumbar part to the pressure receiving element in order to cause upward displacement of the headrest to a given point for receiving seat occupant's head and also stably retain the headrest at that given point. However, the problem is that, in most of seat back used in this kind of seat, the upper region thereof for supporting the dorsal part of seat occupant is more elastic and cushiony than the lower region thereof for supporting the lumbar part of seat occupant, and therefore, the dorsal part of seat occupant will be more deeply sunk backwards into the upper region of seat back than his or her lumbar part. In that instance, the seat occupant's seating posture is naturally changed to shift his or her weight in a direction from the lumbar part to the dorsal part, which will possibly reduce the degree of load applied to the pressure receiving element from the seat occupant's lumbar part. Hence, as far as the present prior art relies only on a pressure from the seat occupant's lumbar part to the pressure receiving element, it is likely that, if that pressure is lower than a predetermine degree, the headrest will not reach the foregoing given point for supporting seat occupant's head and will not be retained at that point for safety purpose, neither.

SUMMARY OF THE INVENTION

In view of the above-stated drawbacks, it is a primary purpose of the present invention to provide an improved seat back structure of vehicle seat with headrest, which avoids an excessive impact to the dorsal part of seat occupant in the case of rear-end collision at the time of commencement of pressure receiving portion to receive the seat occupant's dorsal part, and also insures to cause continued displacement of the headrest to an upwardly displaced point by a load applied from the lumbar part of seat occupant.

In order to achieve such purpose, there is basically provided a structure of seat back of vehicle seat wherein a support shaft is rotatably connected between an end potion of one of a pair of right-side and left-side rotating links and an end portion of another of such pair of right-side and left-side rotating links, such that rotation of the pair of right-side and left-side rotating links causes vertical displacement of the support shaft along an arcuate path, wherein a holder bracket of a cylindrical configuration is integrally provided to the support shaft, wherein a stay portion of the headrest is inserted and retained in the holder bracket, wherein a guide element is fixed on an upper frame member of seat back frame, with such an arrangement that the holder bracket is slidingly movable and inclinable through the guide element, and that, when the pair of right-side and left-side rotating links are rotated due to a load in excess of a predetermined biasing force of a basing means, the holder bracket is moved through the guide element in a direction upwardly of the seat back frame, so that the headrest is displaced to an upwardly displaced point, while being inclined relative to the guide element in a direction forwardly of the seat back frame, wherein a vertical pressure-receiving element is movably provided to the seat back frame, the vertical pressure-receiving element being adapted for receiving a load to be applied at least from a lumbar part of seat occupant and also having a lower end portion disposed at a lower region of the seat back frame, wherein a guide hole is defined in such a manner as to slope upwardly as it proceeds to a side backwardly of the seat back frame, wherein the lower end portion of the vertical pressure-receiving element is slidably inserted in the guide hole and also arranged in an interlocking relation with the support shaft, so that, upon the load being applied from the lumbar part of seat occupant to the vertical pressure-receiving element, the lower end portion of the vertical pressure-receiving element is moved along the guide hole in a direction backwardly of the seat back frame, thereby causing backward and upward displacement of the vertical pressure-receiving element itself to press the support shaft upwardly, which in turn causes commencement of rotation of the pair of right-side and left-side rotating links to thereby cause the headrest to displace from a home position, wherein a cross pressure-receiving element is provided for receiving a load to be applied from a dorsal part of said seat occupant, wherein a pair of right-side and left-side actuator link assemblies are provided, each being of such a type wherein the body thereof is stretchable and contractible, and having one upper end portion disposed at the upper region of the seat cushion frame, wherein said pair of right-side and left-side actuator link assemblies are at the respective two upper end portions thereof pivotally connected with the pair of right-side and left-side rotating links, respectively, at a point below the support shaft, with such an arrangement that, subsequent to such commencement of rotation of the pair of right-side and left-side rotating links, a load is applied from the dorsal part of seat occupant to the cross pressure-receiving element, and that, upon receiving that load, the cross pressure-receiving element is forcibly displaced in a direction backwardly of the seat back frame, which causes the pair of right-side and left-side actuator link assemblies to stretch to thereby assist in continuation of the rotation of the pair of right-side and left-side rotating links to continue displacement of the headrest to said upwardly displaced point, and wherein, upon arrival of the headrest at the upwardly displaced point, the afore-said right-side and left-side support link assemblies are stretched to an extent of acting upon the right-side and left-side rotating links so as to retain the headrest at the upwardly displaced point.

It is a second purpose of the present invention to provide a simplified arrangement of the foregoing vertical and cross pressure-receiving elements in the seat back frame.

For that purpose, the vertical pressure-receiving element may be formed by a rod member having an elastic property, and such rod member may be arranged so as to receive the load to be applied from the dorsal part of seat occupant, in addition to the load to be applied from the lumbar part of that seat occupant. Also, the cross pressure-receiving element may be extended between the afore-said pair of right-side and left-side actuator link assemblies and disposed at a point backwardly of and spaced apart from the vertical pressure-receiving element, such that, when the load is applied from the dorsal part of seat occupant toward the cross pressure-receiving element, the vertical pressure-receiving element is resiliently warped toward the cross pressure-receiving element, and then, that particular cross pressure-receiving element receives the thus-warped vertical pressure-receiving element.

It is a third purpose of the present invention to insure that the headrest is still retained at the upwardly displaced point.

To attain such purpose, the afore-said biasing means may comprise an extension coil spring, and said extension coil spring may be at one end thereof securely connected with each of the afore-said pair of right-side and left-side rotating links at a point above a central axis of the support shaft, while being at another end thereof securely connected with a lower region of seat back frame, wherein such another end extends downwardly of the seat back frame, so that the extension coil spring is resiliently stretched between those one and another ends thereof, thereby giving the afore-said predetermined biasing force to each of the right-side and left-side rotating links. When the headrest is at the upwardly displaced point and both of the right-side and left-side rotating links have been rotated by an angle of rotation relative to the respective pivotal points thereof, a line of force of the extension coil spring is disposed at a point adjacent to and backwardly of the pivotal points of said pair of right-side and left-side rotating links, with respect to the said angle of rotation.

Further, each of said pair of right-side and left-side rotating links may be arranged such that, when the headrest is at the upwardly displaced point and both of the right-side and left-side rotating links have been rotated by an angle of rotation relative to the respective pivotal points thereof, another pivotal point, at which said support shaft is pivotally connected with the end portion of each of the right-side and left-side rotating links, is located at a predetermined position with respect to the said angle of rotation, so that, when another load is applied in a direction backwardly of the seat back towards and exerted on the headrest which is at the upwardly displaced point, a component force is generated from said another load at the afore-said another pivotal point being located at the afore-said predetermined position and transmitted from that particular another pivotal point in a direction above the pivotal point associated with each of the right-side and left-side rotating links, thereby retaining the headrest at the upwardly displaced point against the predetermined biasing force of said biasing means.

It is a fourth purpose of the present invention to prevent wobbling or rattling of the headrest at any one of the afore-said home position and the afore-said upwardly displaced point.

For that purpose, the guide element may be formed such that it has a though-hole formed therein, the through-hole being adapted to allow the holder bracket to be inserted therein, and also has, defined in that through-hole, a forward inner wall facing forwardly of the seat back and a backward inner wall facing backwardly of the seat back, and that a pair of first support surfaces are defined in the forward and backward inner walls, respectively, so as to be disposed in a spaced-apart and offset manner in relation to the through-hole, and a pair of second support surfaces are defined in the forward and backward inner walls, respectively, so as to be disposed in a spaced-apart and offset manner in relation to the through-hole, and wherein the pair of first support surfaces extend in parallel with each other and are both inclined by an angle equal to an angle of inclination assumed by the holder bracket when the headrest is at the afore-said home position, whereas on the other hand, said pair of second support surfaces extend in parallel with each other and are both inclined by an angle equal to an angle of inclination assumed by the holder bracket when the headrest is at the afore-said upwardly displaced point, thereby allowing the holder bracket to be retained between the two first support surfaces when the headrest is at the home position, while allowing the holder bracket to be retained between the two second support surfaces when the headrest is at the upwardly displaced position.

Other various features and advantages of the present invention will become apparent from reading of the descriptions, hereinafter, with reference to the annexed drawings.

BRIEF DESCRIPTION OF THE DRAWINGS

FIG. 1 is a longitudinal sectional view of a seat back structure of vehicle seat in accordance with the present invention, which shows its mechanical actions when a headrest is displaced to an upwardly displaced point;

FIG. 2 is a longitudinal sectional view of the seat back structure, which shows the state where the headrest is set at a lower home position;

DETAILED DESCRIPTION OF PREFERRED EMBODIMENT OF THE INVENTION

Figure 3:
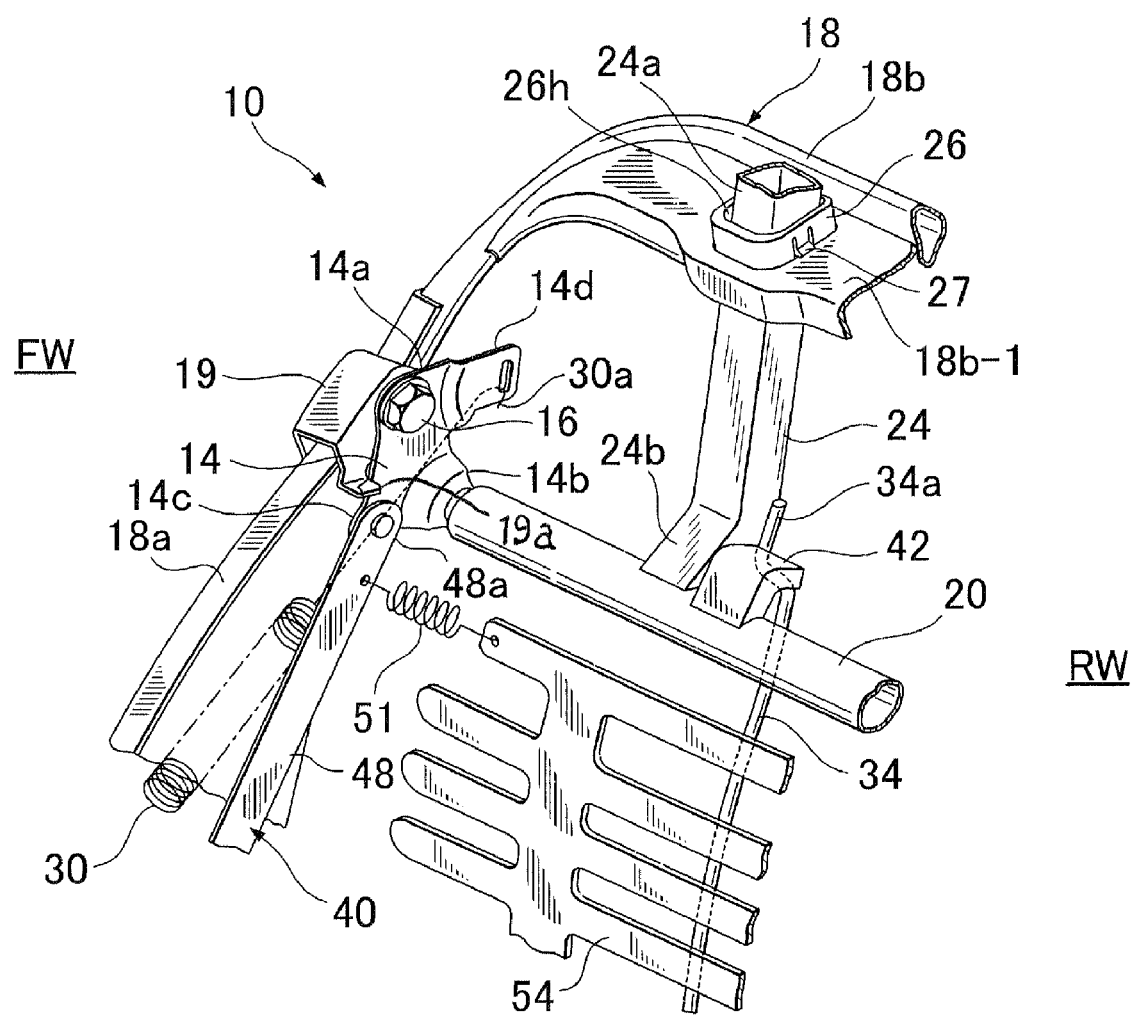
FIG. 3 is a partly broken schematic perspective view showing one principal part of the seat back structure.
Figure 4:
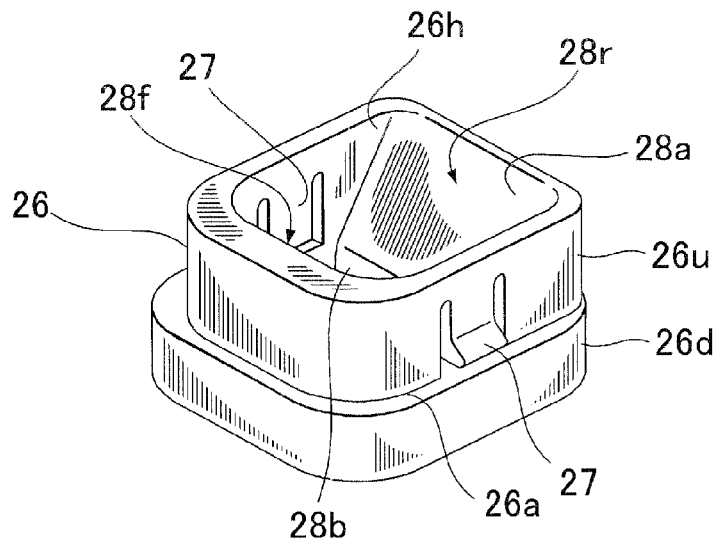
FIG. 4(A) is a schematic perspective view of a guide element used in the seat back structure.
FIG. 4(B) is a longitudinal sectional view of the guide element, which explanatorily shows an operative relation of the guide element with a holder bracket.
Figure 4:
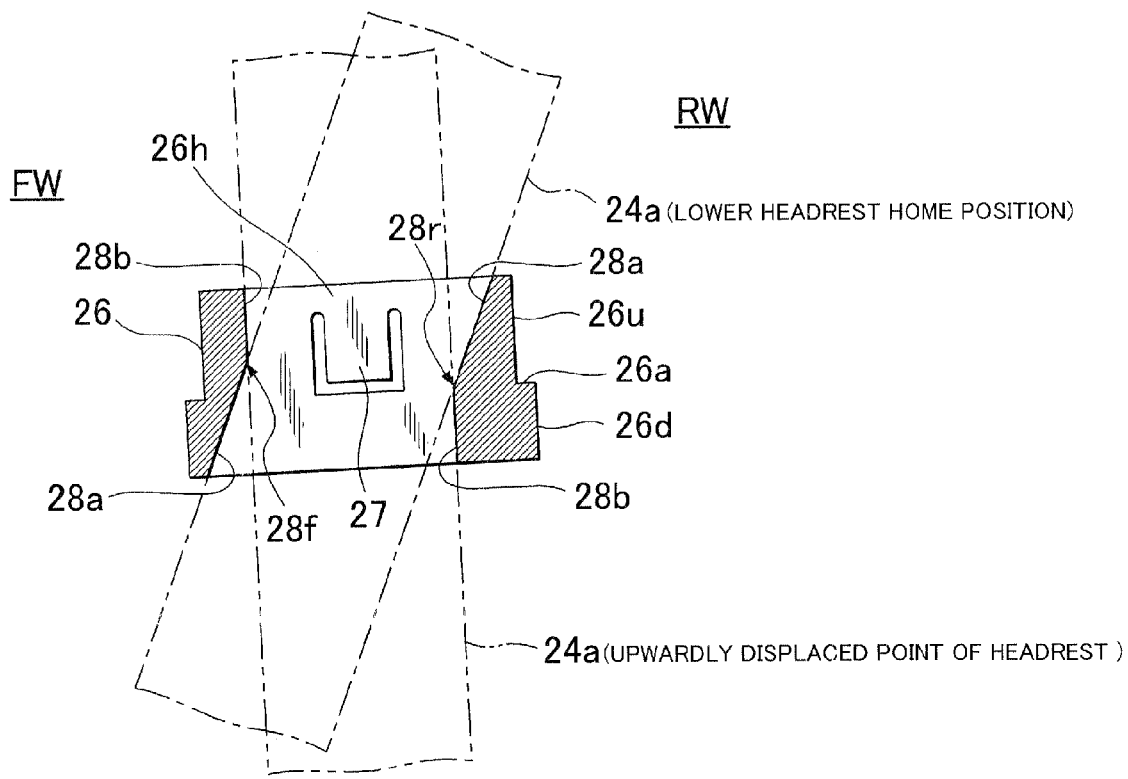

Referring to FIGS. 1 to 6, there is illustrated a preferred exemplary embodiment of seat back structure of vehicle seat in accordance with the preset invention. It is noted that the vehicle seat itself is not shown in the drawings, which comprises a seat back (10) to be elaborated hereinafter and an unshown seat cushion, but, it should be understood that a seat occupant (not shown) is to sit on the vehicle seat and rest his or her lumbar and dorsal parts on the seat back (10).

FIG. 1 is a schematic longitudinal sectional view for structurally depicting the inside of the seat back (10). As shown, in accordance with the present invention, the seat back (10) is provided with an headrest (12) of an emergency active type workable in rear-end collision case, wherein, when a rear-end collision occurs, in response to a backward great pressure applied from a seat occupant on the vehicle seat under a backward inertia of the seat occupant, the headrest (12) will be immediately displaced upwardly from a lower home point (indicated by the one-dot chained lines) to a given point where the headrest (12) assumes forwardly inclined state.

FIGS. 2 and 3 show the state where the headrest (12) is set at the lower headrest home position. Designation (18) denotes a seat back frame provided in the seat back (10). The seat back frame (18) includes an upper frame member (18b), a lateral frame member (18a) and a lower frame member (18c). While not shown clearly, with regard to the lateral frame member (18a), it is to be understood that a pair of right-side and left-side lateral frame members (18a) (18a) are connected between the upper and lower frame members (18b) (18c), as well known in the art. Hence, a description of the present invention will be made, based on such understanding.

It is to be seen that the upper frame member (18b) has a downwardly sloped plate region (18b-1) which extends forwardly therefrom and also extends transversely of the two lateral frame members (18a), and that each of the two lateral frame members (18a) extends downwardly from the upper frame member (18b).

It is noted that the wording, "forward" or "forwardly", refers to a side (FW) forwardly of the seat back (10) or vehicle seat (not shown), and the wording, "backward" or "backwardly", refers to a side (RW) backwardly the seat back (10) or vehicle seat.

Specifically, in accordance with the present invention, as seen in the FIGS. 2 and 3, a left-side rotating link (14) is pivotally connected via a pin (16) with a connecting bracket (19) fixed to an upper region of left-side lateral frame member (18a) of the seat back frame (18). While not shown, it is to be understood that another right-side rotating link (14) is likewise pivotally connected via a pin (16) with another connecting bracket (19) fixed to an upper region of right-side lateral frame member (18a) of the seat back frame (18).

As best shown in FIG. 3, each of the two rotating links (14) is so formed to comprise: a pivotal region (14a) which is pivotally connected via the pin (16) with the bracket (19) and faces to the forward side (FW); a first connecting region (14b) defined distant from the pivotal region (14a) in a direction to the backward side (RW); a second connecting region (14c) defined forwardly and downwardly of the first connecting region (14b); and a third connecting region (14d) which is defined distant from the pivotal region (14a) in a direction to the backward side (RW) and above the first connecting region (14b).

As shown, one end of a support shaft (20) is rotatably connected with the foregoing first connecting region (14b) of left-side rotating link (14), and, though not shown, it is to be understood that another end of the support shaft (20) is rotatably connected with a first connecting region (at 14b) of another right-side rotating link (14). Hence, a person skilled in the art can readily understand that the support shaft (20) is rotatably journalled between the two rotating links (14) so as to be rotatively displaceable upwardly and downwardly along an arcuate path relative to the pin (16) as understandable from FIGS. 1 and 2.

Firmly connected at its lower end with the support shaft (20) is a holder bracket (24) of generally cylindrical configuration, in which a stay (22) of headrest (12) is inserted and retained, thereby supportively connecting the headrest (12) with the seat back (10). A guide element (26) is securely engaged in the downwardly inclined region (18b-1) of the seat back frame upper ember (18b). In brief, the guide element (26) is so adapted that the holder bracket (24) is slidably inserted therethrough at a certain angle with the seat back (10) that is set in the shown upright state or set vertically along a vertical line extending through that seat back (10), when the seat back (10) is in a normal use, and that, on the other hand, upon rotation of the rotating link (14) in the case of rear-end collision case, the holder bracket (24) is to be displaced upwardly, while being inclined forwardly, with respect to the guide element (26), as understandable from FIG. 1.

As seen in FIGS. 2 and 3, the holder bracket (24) is of a generally dogleg shape as viewed from its lateral side, and has an upper rectilinear portion (24a) and a lower sloped portion (24b), such that the latter (24b) extends in a downwardly and forwardly slant direction from the former (24a). This holder bracket (24) is of a generally rectangular shape in cross-section having a hollow therein, and, a stay (22) of the headrest (12) is inserted in the inside of that holder bracket (24) via a stay holder (29) and received supportively therein.

The stay holder (29) is securely attached in the end region of the upper rectilinear portion (24a) of the holder bracket (24) at a given position by a lock mechanism (not shown) in the vertical direction thereof. The structure of the stay holder (29) is not the subject matter of the present invention and thus a further detailed description thereon is omitted.

As illustrated, the upper rectilinear portion (24a) of the foregoing holder bracket (24) passes through a through-hole (26h) of the guide element (26) and is disposed therein.

As will be elaborated later, the holder bracket (24) is displaceable vertically through the guide element (26), while changing its inclination angle, between a lower headrest home position and an upwardly displaced point of headrest. Namely, in brief, as far as the illustrative embodiment is concerned, as understandable from FIGS. 2 and 4(B), when the holder bracket (24) is in the shown position where the upper rectilinear portion (24a) thereof is inclined backwardly at a first given angle relative to the downwardly sloped plate region (18b-1) of upper frame portion (18b), the headrest (12) is set at a normal home position, as indicated by "LOWER HEADREST HOME POSITION." On the other hand, as understandable from FIGS. 1 and 4(B), in the case of rear-end collision, when the headrest (12) is displaced upwardly from the lower home position, as indicated by "UPWARDLY DISPLACED POINT OF HEADREST", the holder bracket (24) is in the shown position where the upper rectilinear portion (24a) thereof is inclined forwardly at a second given angle relative to the downwardly sloped plate region (18b-1). Hereinafter, for the sake of simplicity, the wording "LOWER HEADREST HOME POSITION" shall be referred to as "lower headrest home position" or "lower home position", whereas the wording "UPWARDLY DISPLACED POINT OF HEADREST" be referred to as "upwardly displaced point of headrest" or "upwardly displaced point".

FIGS. 4(A) and 4(B) illustrate a specific structure of the guide element (26). According thereto, a forward inner wall (28f) and a backward inner wall (28r) are defined in the through-hole (26h) of the guide element (26). As in FIG. 4(B), respectively defined in such forward and backward inner walls (28f) and (28r) are a pair of first support surfaces (28a) and (28a) which are spaced apart from each other and disposed in an offset manner in relation to the through-hole (26h) so as to be in parallel with each other. Also, respectively defined in those two walls (28f) and (28r) are a pair of second support surfaces (28b) and (28b) which are spaced apart from each other and disposed in an offset manner in relation to the through-hole (26h) so as to be in parallel with each other. In other words, one set of the first and second support surfaces (28a) (28b) is defined in the forward inner wall (28f), while another set of the first and second support surfaces (28a) (28b) is defined in the backward inner wall (28r).

In the illustrative embodiment, the guide element (26) itself is securely provided in the downwardly sloped plate region (18b-1) of seat back frame upper portion (18b), and, in view thereof, the two first support surfaces (28a) are both sloped with respect to the downwardly sloped plate region (18b-1) so as to provide an angle of inclination thereof equal to the aforementioned first given angle, whereas the two second support surfaces (28b) are substantially perpendicular with the sloped plate region (18b-1) so as to provide an angel of inclination thereof equal to the aforementioned second given angle. Hence, when the headrest (12) is set in the above-noted lower headrest home position, the pair of first support surfaces (28a) are in a close contact with the respective two opposite lateral surfaces of the holder bracket upper rectilinear portion (24a), thereby positively supporting the holder bracket (24) as indicated by the one-dot chain lines in FIG. 4(B). On the other hand, when the headrest (12) is displaced to and positioned at the above-noted upwardly displaced point of headrest, the pair of second support surfaces (28b) are in a closed contact with the respective two opposite lateral surfaces of holder bracket upper rectilinear portion (24a), thereby positively supporting the holder bracket (24) as indicated by the two-dot chain lines in FIG. 4(B).

Designations (27) in FIG. 3 and FIGS. 4(A) and 4(B) denote a pair of securing hook parts formed integrally with the guide element (26) so as to have a resilient property. In this respect, the guide element (26) comprises upper and lower portions (26u) (26d) and a shoulder region (26a) defined peripherally thereof between the upper and lower portions (26u) (26d). As shown, the two securing hook parts (27) are formed in the upper portion (26u) so as to be spaced from the shoulder region (26a) a distance substantially equal to a thickness of the downwardly sloped plate region (18b-1). Thus, the guide element (26) is securely attached in that sloped plate region (18b-1) by means of the two securing hook parts (27).

As constructed above, the support shaft (20) is supported by the rotating link (14) in a vertically movable manner, and therefore, as the rotating link (14) is rotated, the support shaft (20) is simultaneously displaced in vertical direction, to thereby cause the headrest (12) to displace in the likewise vertical direction towards one of the previously stated lower home position and upwardly displaced point. More specifically, with clockwise and anticlockwise rotation of the rotating link (14) about the pivot pin (16), the support shaft (20) backwardly of that pivot pin (16) is displaced downwardly and upwardly along an arcuate path relative to a central axis of the pivot pin (16), while being simultaneously displaced forwardly and backwardly relative to the pivot pin (16). This means that the clockwise rotation of rotating link shaft (14) causes downward and forward displacement of the support shaft (20) relative to the pin (16), whereas, the anticlockwise rotation of rotating link (14) causes upward and backward displacement of the support shaft (20) relative to the pin (16). Hence, it follows that, with the afore-said downward and forward displacement of support shaft (20), the headrest (12)

is displaced downwardly, while being inclined backwardly, relative to the guide element (26), whereas, with the aforesaid upward and backward displacement of support shaft (20), the headrest (12) is displaced upwardly, while being inclined forwardly, relative to the guide element (26) (see FIGS. 1 and 2).

In the present embodiment, as can be seen in FIGS. 2 and 3, a stopper piece (19a) is formed integrally with the connecting bracket (19) so as to project therefrom inwardly of the seat back frame lateral frame member (18a) to limit clockwise rotation of the rotating link (14), so that the headrest (12) is assuredly prevented against any further displacement beyond the lower headrest home position.

A biasing means (30) is provided to give a biasing force to the rotating link (14) so as to biasingly retain the headrest (12) at the lower headrest home position. That is, under the biasing force of the biasing means (30), the headrest (12) is biased to and retained at the lower headrest home position.

According to the present embodiment, the biasing means (30) is embodied by an extension coil spring. As illustrated for example, the extension coil spring (30) may be at the upper end (30a) thereof securely engaged with the third connecting region (14d) of the left-side rotating link (14) at a point above the support shaft (20), while being at the lower end (30b) thereof securely engaged in the connecting hole (32) formed in the lower region of the left-side lateral frame member (18a) of seat back frame (18). In this regard, it is to be understood that, while not shown, another extension coil spring (30) may be at the upper end (30a) thereof securely engaged with a third connecting region (14d) of another right-side rotating link (14) at a point above the support shaft (20), while being at the lower end (30b) thereof securely engaged in a connecting hole (32) formed in the lower region of another right-side lateral frame member (18a) of seat back frame (18).

With such arrangement, a biasing force is always given from the extension coil springs (30) to the rotating links (14), thereby biasingly retaining the headrest (12) at the lower home position. With the foregoing construction, the headrest (12) is provided, as an emergency active type of headrest, upon the seat back (10), whereupon a seat back structure with emergency active headrest is established, so to speak. It is noted that the biasing force of the biasing means or the extension coil spring (30) is preset to such a degree that allows the springs (30) itself to be resiliently stretchable only when it receives a great backward load caused under a backward inertia of seat occupant in a rear-end collision case, to thereby permit anticlockwise rotation of the rotating link (14) so as to cause the headrest to move to the upwardly displaced point. In this respect, in accordance with the present invention, the seat back (10) is of such a structure wherein a pressure receiving member to be set forth later is arranged so as to receive the afore-said great backward load created under backward inertia of seat occupant and transmit the same to the rotating link (4) as a force of rotation sufficient to cause the anticlockwise rotation of that particular rotating link (4) against the biasing force of extension coil springs (30), which in turn causes the headrest (12) to reach the upwardly displaced point.

More specifically, in the present invention, there is provided a vertical pressure-receiving member (34) extending vertically of the seat back frame (18), which is adapted to receive a load applied from at least a seat occupant's lumbar part (not shown). As will be elaborated, in brief, a lower end of the vertical pressure-receiving member (34) is slidably inserted in a guide hole (36) which is inclined upwardly as it proceeds to the backward side, and the vertical pressure-receiving member (34) per se has an operative and interlocking connection with the support shaft (20). Further, there are provided a cross pressure-receiving member (38) extending in a direction transversely of the seat back frame (18), which is adapted to receive a load applied from a seat occupant's dorsal part (not shown), and an actuator link assembly (40) of a stretchable type wherein the body thereof is stretchable and contractible in the longitudinal direction thereof. The actuator link assembly (40) is at the upper end thereof pivotally connected with the second connecting region (14c) of the left-side rotating link (14), such that the said upper end of the actuator link assembly (40) is situated below the support shaft (20). While not shown, a pair of such actuator link assemblies (40) are provided, and therefore, it is to be understood that another actuator link assembly (40) is at the upper end thereof pivotally connected with a second connecting region (14c) of another right-side rotating link (14) which is previously stated, and that the afore-said cross pressure-receiving member (38) is extended between such pair of actuator link assemblies (40) which are disposed adjacent to the respective left-side and right-side lateral frame members (18a) of the seat back frame (18).

As illustrated, the afore-said vertical pressure-receiving member (34) may preferably be a vertically extending pressure receiving rod, by way of example. Such pressure receiving rod (34) has a direct connection with the support shaft (20) as will be stated below, and is rigid in its longitudinal direction sufficient to provide a strength that withstands an upward vertical force attempting to cause anticlockwise rotation of both support shaft (20) and rotating link (14), while being on the other hand resiliently bendable by a backward load applied from a dorsal part of seat occupant.

Figure 5:
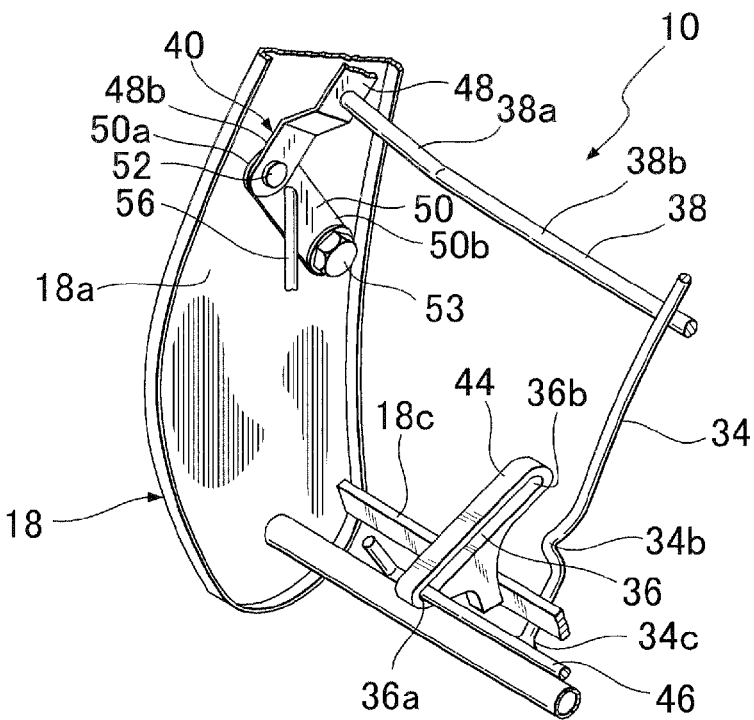
FIG. 5 is a partly broken schematic perspective view of another principal part of the seat back structure.

As can be seen FIGS. 2 and 3 as well as FIG. 5, the vertical pressure-receiving member (34) is movably extended between a connecting member (42) fixed on the support shaft (20) and a guide hole (36) of a guide member (44) fixed on the lower frame member (18c) of seat back frame (18). The connecting member (42) has a through-hole that permits insertion therethrough of an upper end portion (34a) of the vertical pressure-receiving member (34), wherein such upper end portion (34a) has a shoulder region therebelow which is bent horizontally from the vertical pressure-receiving member (34), and that particular shoulder region is abutted against the connecting member (42), as best shown in FIG. 3. The vertical pressure-receiving member (34) is displaceable backwardly and upwardly, while the lower end thereof being movable backwardly along the sloped guide hole (36) of guide member (44), so that the vertical pressure-receiving member (34) itself elevates to cause anticlockwise rotation of the rotating link (14) for displacement of the headrest (12) to the upwardly displaced point.

While not shown, in addition to the foregoing guide member (44), another guide member (44) having a sloped guide hole (36), identical to the former, is provided. Hence, it is to be understood that a pair of the guide members (44) (44) are fixed on the seat back frame lower frame member (18c) in a spaced-apart manner so as to be disposed on the left and right sides, respectively. In this respect, it is also to be understood that a slide rod (46), fixed to the lower end of the vertical pressure-receiving member (34), is at the two end portions thereof slidably inserted in respective two sloped guide holes (36) (36) respectively of the two guide members (44) (44). Thus, movement of the lower end of vertical pressure-receiving member (34) along the sloped guide holes (36) insures to cause upward and downward displacement of the vertical pressure-receiving member (34) itself.

In this regard, the afore-said lower end of vertical pressure-receiving member (34) or the slide rod (46) is disposed at a point to which most of backward load is to be applied in the case of rear-end collision, wherein the backward load is a load caused by a backward displacement of seat occupant's lumbar part under the backward inertia of that particular seat occupant. Accordingly, upon receiving such backward load, the lower end of vertical pressure-receiving member (34) is displaced backwardly and upwardly due to the slide rod (46) being sliddingy moved in and along the sloped guide hole (36).

As stated previously, in the present invention, the cross pressure-receiving member (38) adapted to receive a load applied from a seat occupant's dorsal part is extended between the pair of actuator link assemblies (40) each being of a stretchable and contractible type and having the upper end thereof pivotally connected with the second connecting region (14c) of rotating link (14), such that the said upper end of the actuator link assembly (40) is situated below the support shaft (20).

As shown by way of example, each of the actuator link assemblies (40) is basically formed by a combination of an upper long link member (48) and a lower short link member (50), such that those two link members (48) (50) are rotatably connected with each other. Specifically, the upper long link member (48) is at the upper end (48a) thereof pivotally connected via a pin (48p) with the second connecting region (14c) of rotating link (14), while being at the lower end (48b) thereof pivotally connected via a pin (52) with an upper end (50a) of the lower short link member (50). The lower end (50b) of the lower short link member (50) is pivotally connected via a pin (53) with the inward surface of the seat back frame lateral frame member (18a), thereby allowing the upper end (50a) of lower short link member (50) to be rotatable upwardly and downwardly relative to the pin (53). The illustrated cross pressure-receiving member (38) is formed by bending a rod material of high rigidity into a generally U-shaped configuration. While not clearly shown, but, as understandable from FIG. 5, the generally U-shaped cross pressure-receiving member (38) has a horizontal portion (38b) and a pair of vertical lateral portions (38a) (38a) extending vertically from two ends of that horizontal portion (38b). It is therefore to be understood that the two vertical lateral portions (38a) (38a) of the cross pressure-receiving member (38) are at the two respective ends thereof fixedly connected with the left-side and right-side upper long link members (48) (48), respectively, with the horizontal portion (38b) thereof disposed backwardly of those upper long link members (48).

It is noted here that the cross pressure-receiving member (38) is disposed backwardly of and spaced apart from the vertical pressure-receiving member (34). Otherwise stated, as understandable from FIGS. 2 and 5, the horizontal portion (38b) of the cross pressure-receiving member (38) is disposed backwardly of and spaced apart from the vertical pressure-receiving member (34).

As shown in FIGS. 2 and 3, in the present embodiment, a support plate (54) of elastic property is arranged and resiliently supported anteriorly of the vertical pressure-receiving member (34). That is, for example, though not shown, it is to be understood that the support plate (54) is at the two upper portions thereof resiliently connected via extension coil springs (51) with the respective two upper long link members (48). In that way, a backward load applied from a seat occupant is transmitted and imparted via such support plate (54) to each of the vertical and cross pressure receiving members (34) (38), As seen in FIG. 2, the lower portion of the support plate (54) is coupled with and supported by a connecting link (56) having one end pivotally connected with the left-side lower short link member (50) of actuator link assembly (40). While not shown, it is to be understood that another connecting link (56) is likewise at one end thereof pivotally connected with another right-side lower short link member (50), and therefore, the lower portion of support plate (54) is supportively connected with the left-side and right-side connecting links (56).

The support plate (54) is further formed integrally with an engagement bar (58) in the lower end thereof, with such an arrangement that, upon the support plate (54) being displaced backwardly, such engagement bar (58) is brought to engagement with an protrudent engagement region (34b) which is formed by bending the corresponding part in the lower portion of the vertical pressure-receiving member (34), to thereby assist in upward displacement of the vertical pressure-receiving member (34).

In this context, generally stated, when a seat occupant (not shown) using the present seat back structure assumes a normal seating or driving posture, a lumbar part of the seat occupant is substantially in a close contact with the corresponding surface area of seat back, whereas by contrast, a dorsal part of the seat occupant is in most cases positioned away from the seat back. Due to that fact, generally stated, in the case of rear-end collision, as the seat occupant is moved backwardly under his or her backward inertia, the lumbar part of the seat occupant is fist pressed against the vertical pressure-receiving member (34), prior to his or her dorsal part being pressed against the cross pressure-receiving member (38). Therefore, in the present invention, when a rear-end collision occurs, resulting in backward movement of a seat occupant under his or her backward inertia, a lumbar part of the seat occupant is first moved backwardly to exert a pressure upon the support plate (54), which in turn causes displacement of the lower portion of the support plate (54) in the direction backwardly of seat, with concurrent backward rotation of the connecting links (56) connected with that particular support plate lower portion (see the one-dot chain lines in FIG. 2). Then, upon the engagement bar (58) situated below the connecting links (56) being engaged with the protrudent engagement region (34b), an upward pressing force is applied through that engagement bar (58) to the lower end portion of the vertical pressure-receiving member (34). If such upward pressing force exceeds a biasing force of the biasing means (30), the lower end side of the vertical pressure-receiving member (34) is displaced backwardly and upwardly along the guide hole (36), thereby directly pressing the support shaft (20) upwardly in conjunction with anticlockwise rotation of the rotating link (14), such that the support shaft (20) is displaced upwardly a distance corresponding to a predetermined distance between the lower headrest home position and the upwardly displaced point of headrest. In this regard, more specifically stated, if the upward pressing force exceeds a biasing force of the biasing means (30), the slide rod (46) fixed to the lower end of vertical pressure-receiving member (34) is slidingly moved along the sloped guide hole (36) in a direction from a forward edge (36a) to a backward edge (36b) of that particular sloped guide hole (36), wherein the forward edge (36a) is lower than the backward edge (36b). It is noted here that a distance between those two edges (36a) and (36b) is preset as a predetermined range within which the headrest (12) is to be displaced from its lower home position to its upwardly displaced point, or vice versus, as understandable from FIGS. 1, 2 and 4(B). Therefore, as the slide rod (46) moves from the forward edge (36a) backwardly and upwardly to the backward edge (36b), the vertical pressure-receiving member (34) is displaced upwardly, thereby applying an upward pressing force directly to the support shaft (20), with the result that the support shaft (20) is displaced an amount corresponding to the afore-said predetermined movable range of the headrest (12), and thus, the headrest (12) is assuredly displaced to and stopped at the upwardly displaced point.

Hereinafter, for the sake of simplicity, the shown (left-side) parts of the foregoing pair of right-side and left-side constituent elements (e.g. the pair of rotating links (14) and the pair of actuator link assemblies (40)) will be mainly described.

With the above-described arrangement, it is to be seen that a great upward pressing force, overcoming the biasing force of the biasing means (30), is applied from the vertical pressure-receiving member (34) to the support shaft (20), and at that moment, the rotating link (14) starts to rotate anticlockwise about the pin (16) to cause displacement of the headrest (12) towards the upwardly displaced point. In other words, in the present invention, upon a load being inputted from a seat occupant's lumbar part to the vertical pressure-receiving member (34), the rotating link (14) immediately starts its rotation, thereby insuring to reduce an impact given to the dorsal part of seat occupant at the point of time when the rotating link (14) starts its rotation. In this regard, more specifically stated, responsive to a load inputted from the seat occupant's lumbar part, the vertical pressure-receiving member (34) is moved upwardly to cause the rotating link (14) to immediately start to rotate about the pin (16) anticlockwise or backwardly, thereby causing backward displacement of the upper long link member (48). Shortly thereafter, the cross pressure-receiving member (38) fixed to that upper long link member (48) start to be displaced backwardly before it receives a backward load applied from the seat occupant's dorsal part. This means that the cross pressure-receiving member (38) has already been displaced backwardly, not still anymore, at the point of time when it receives the backward load from the seat occupant's dorsal part, and therefore, the backward load is softly received by the cross pressure-receiving member (38), which gives no direct impact and no excessive impact to the seat occupant's dorsal part.

In this context, as stated above, in a rear-end collision case, the seat occupant's lumbar part is displaced backwardly, under the backward inertia of seat occupant, toward the vertical pressure-receiving member (34). A stroke of such lumbar part backward displacement relative to the vertical pressure-receiving member (34) is relatively small, which results in an immediate strong backward displacement of the seat occupant's lumbar part to the latter (34). A great upward pressing force is therefore caused in the vertical pressure-receiving member (34) sufficient to cause the rotating link (14) to immediately commence anticlockwise rotation as mentioned above, thereby insuring that the cross pressure-receiving member (38) starts to be displaced backwardly before it receives a backward load applied from the seat occupant's dorsal part, thus effectively reducing an impact to that particular dorsal part.

Following such commencement of anticlockwise rotation of rotating link (14), the lower end of the vertical pressure-receiving member (34) continues to be displaced backwardly by the backward load being applied from the seat occupant's lumbar part, so that the rotating link (14) continues its anticlockwise rotation to cause the headrest to displace towards the upwardly displaced point, while at the same time, the seat occupant's dorsal part, displaced backwardly under backward inertia of the seat occupant, is pressed against the cross pressure-receiving member (38). Thus, the upper long link member (48) receives additional backward force from the cross pressure-receiving member (38) and is thereby displaced in further backward direction. This assists in continued anticlockwise rotation of the rotating link (14) to insure displacement of headrest (12) towards the upwardly displaced point of headrest.

Accordingly, in the present invention, it is to be seen that, after the rotating link (14) has started the anticlockwise rotation as above, additional backward loads are applied from both seat occupant's lumbar and dorsal parts to the rotating link (14) as well as to the respective vertical and cross pressure-receiving members (34) (38), and such additional backward loads are transformed through the actuator link assembly (40) into an additional upward pressing force which is imparted to the rotating link (14), and that, owing to those additional backward loads, the rotating link (14) continues its anticlockwise or backward rotation, so that the headrest (12) is continuously displaced toward the upwardly displaced point of headrest and eventually retained thereat so long as the afore-said additional backward loads are applied to the rotating link.

As stated above, after the rotating link (14) has started the anticlockwise rotation to execute the above-described prior backward displacement of cross pressure-receiving member (38), the seat occupant's dorsal part is pressed against such backwardly moving cross pressure-receiving member (38), thereby reducing an impact given to the seat occupant's dorsal part. With this point in view, it is to be appreciated that such prior anticlockwise rotation of the rotating link (14) and the above-described subsequent continued likewise rotation of that particular rotating link (14) provides an increased insurance of lessening an impact given to the seat occupant.

In this connection, we must consider that, in a rear-end collision, the seat occupant's dorsal part will be sunk deeply into the elastic surface of the seat back (10), which will change the seating posture of the seat occupant, and therefore, it is possible that the backward pressing force of seat occupant's lumbar part, caused under the backward inertia, to the vertical pressure-receiving member (34) may decrease correspondingly and may be insufficient to move the latter (34). However, according to the present invention, the cross pressure-receiving member (38) receives the seat occupant's dorsal part being pressed thereagainst under backward inertia of that particular dorsal part, and is displaced backwardly, thereby resulting in continued anticlockwise rotation of the rotating link (14) against the biasing force of the biasing means (39), so that the headrest (12) continued to be displaced towards the upwardly displaced point of headrest and is eventually retained thereat so long as a backward load is applied from the seat occupant's dorsal part to the cross pressure-receiving member (38). Hence, in the present invention, without any resort to the backward load from the seat occupant's lumbar part alone, the headrest (12) can also be displaced by the backward load from the seat occupant's dorsal part, in a direction to the upwardly displaced point of headrest, and be retained thereat.

Accordingly, the present invention makes it possible to simply achieve both of the following two aspects: a high performance of the above-described prior anticlockwise rotation of rotating link (14) which avoids excessive impact given to a seat occupant; and a high reliability of the above-described mechanism that insures to displace the headrest to the upwardly displaced point of headrest and retain thereat, without resort to the pressing force applied from the seat occupant's lumbar part.

According to the present mode of invention, the vertical pressure-receiving member (34) adapted to receive a load from the seat occupant's lumbar part is formed from a rod material having an elastic property and therefore is able to be resiliently warped backwards by a backward load applied thereto from the dorsal part of seat occupant. Thus, when warped backwardly as such, the vertical pressure-receiving member (34) is brought to contact with the cross pressure-receiving member (38), so that the backward load from the seat occupant's dorsal part is sufficiently transmitted and imparted to that particular cross pressure-receiving member (38). In other words, the thus-warped vertical pressure-receiving member (34) and the cross pressure-receiving member (38) are readily arranged in a crossed fashion, which means that an optimum arrangement of those two pressure-receiving members (34) (38) can be readily and assuredly made to insure sufficient transmission of the backward loads from both lumbar and dorsal parts of seat occupant to the rotating link (14).

Further, the elastic vertical pressure-receiving member (34), upon a load being inputted thereto from the seat occupant's dorsal part as above, is resiliently warped, which effectively can lessen an impact given to that particular dorsal part. Such resilient warping of vertical pressure-receiving member (34) also has the advantage that, even if a sufficient load is not applied thereto from the seat occupant's lumbar part, a load from the dorsal part of the seat occupant is applied to and received by the vertical pressure-receiving member (34) itself, thereby causing the lower end (or the slide rod (46)) of that vertical pressure-receiving member (34) to displace backwardly and upwardly along the sloped guide hole (36). This assuredly assists in emergency displacement of the headrest (12) to the upwardly displaced point of headrest.

In the present embodiment, the biasing means (30) is provided as a biasing force that always efforts to return the headrest (12) to the lower headrest home position, and therefore, in order to retain the headrest (12) at the upwardly displaced point of headrest, it is necessary to keep providing a greater force than such biasing force, to the headrest (12). In this regard, reference is made to FIG. 6 wherein the rotating link (14) has been rotated anticlockwise by the shown angle of rotation, which indicates that the headrest (12) is positioned at the upwardly displaced point. Under such state, according to the present invention, the biasing means (30) comprises an extension coil spring, and, it is seen that, with respect to the afore-said angle of rotation of the rotating link (14), a line of force of that extension coil spring is disposed at a point adjacent to and backwardly of the central axis of pivot pin (16) or a pivotal point (P2) of the rotating link (14). This arrangement is intended to effectively reduce a biasing force transmission efficiency of the extension coil spring (30) which attempts to transmit a clockwise biasing force to the rotating link (14) for return of the headrest (12) to the lower headrest home position.

Figure 6:
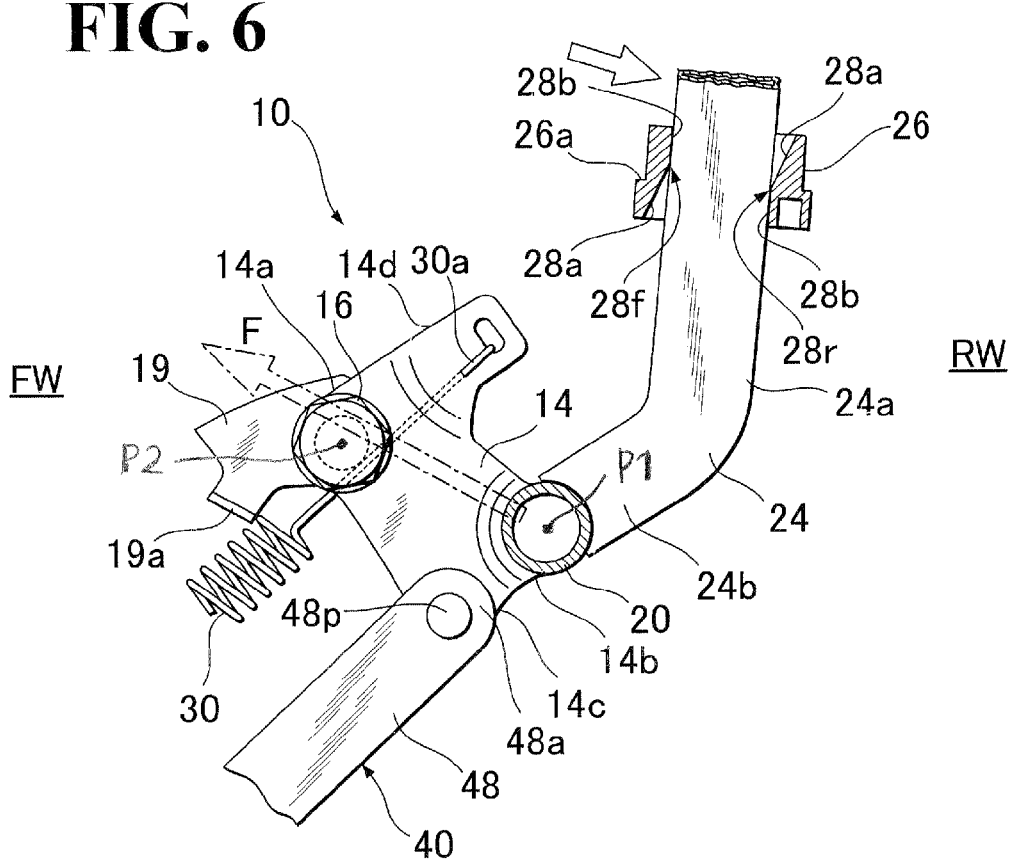
FIG. 6 is a partly broken schematic front view of still another principal part of the seat back structure.

Namely, in such particular arrangement, the line of force of the biasing means (30), or the extension coil spring, is disposed adjacent to the pivotal point (P2) of the rotating link (14), which is effective in intentionally decreasing the biasing force transmission efficiency of the extension coil spring (30) to transmit its biasing force to the rotating link (14) that has been rotated anticlockwise as in FIG. 6, with the headrest (12) set at the upwardly disposed point. This insures to weaken a biasing force required for the extension coil spring (30) to cause clockwise rotation of the rotating link (14) sufficient to initiate return of the headrest (12) to the lower home position from the upwardly displaced point. Hence, when the headrest (12) is at the upwardly disposed point, the biasing force of the spring (30) can be overcome by a relatively small force. In another words, insofar as at least one load exceeding a predetermined degree is applied from either of the seat occupant's lumbar and dorsal parts to the biasing means (30) through the corresponding one of the vertical and cross pressure-receiving members (34) (38), the biasing force of the extension coil spring (30) is overcome thereby and inactive, so that the rotating link (14) is still retained in the state shown in FIG. 6, and therefore, the headrest (12) is retained at the upwardly displaced point. Such particular arrangement insures to retain the headrest (12) at the upwardly displaced point in a rear-end collision case or the like, thereby providing a high reliable headrest action.

Further, in the present invention, under the above-described state where the rotating link (14) has been rotated anticlockwise by the angle of rotation shown in FIG. 6, with the headrest (12) being positioned at the upwardly displaced point, it is to be seen that, with respect to such current angle of rotating link (14), a central axis (P1) of the support shaft (20), which is pivotally connected with that rotating link (14), is located at a point where a component force (F) is to be applied in a direction above a central axis (P2) of the pivotal point (at 16) of the rotating link (14) which is pivotally connected with the connecting bracket (19), wherein the component force (F) is generated in the present headrest mechanism from a backward load applied from the seat occupant's head to the headrest (12) in a rear-end collision case.

More specifically, as stated previously, the holder bracket (24) is slidably supported in the guide element (26) secured on the seat back frame upper member (18a) so as to be inclinable in the previously mentioned manner, and the lower portion (at 24b) of the holder bracket (24) is integrally connected with the support shaft (20) extended between the left-side and right-side rotating links (14). Now, let us assume that a rear-end collision occurs and a head of seat occupant therefore moves forwardly and quickly moves back to the headrest (12), thereby inputting a backward load of the head, or what is generally described as a rebound load, to that headrest (12), as indicated by the solid arrow in FIG. 6. In that case, as indicated by the one-dot chain arrow in FIG. 6, a component force (F) is generated at the afore-stated rotating shaft's central axis (P1) from that rebound load and applied and transmitted in a forward direction above the central axis (P2) of the pivotal point (at 16) of rotating link (14). It is therefore seen that such component force (F) serves as a force attempting to cause anticlockwise rotation of the rotating link (14) about the central axis (P2) to thereby attempt to cause displacement of the headrest (12) towards the upwardly displaced point, and therefore, the headrest is positively prevented from being returned to the lower headrest home position due to the rebound load of seat occupant's head.

Accordingly, the foregoing structural aspect also insures to retain the headrest (12) at the upwardly displaced point in a rear-end collision case or the like, thereby positively adding to the high reliable emergency headrest action of the present invention.

In the present mode of the invention, as described previously, the guide element (26) is so formed to have, provided in combination therein, two first support surfaces (28a) and two second support surfaces (28b) in such a manner that one set of those support surfaces (28a) (28b) are defined in the respective forward and backward inner walls (28f) (28r) thereof, as seen in FIGS. 4(A) and 4(B). It is to be seen that the two first support surfaces (28a) assume a certain common angle of inclination which is equal to an angle of inclination at which the holder bracket upper rectilinear portion (24a) is inclined when the headrest (12) is displaced to the upwardly displaced point, whereas the two second support surfaces (28b) assume a certain common angle of inclination which is equal to an angle of inclination at which the holder bracket upper rectilinear portion (24a) assumes when the headrest is at the lower home position. It is therefore appreciated that such arrangement of guide element (26) insures that both two opposite lateral surfaces of the holder bracket upper rectilinear portion (24a) are brought in close contact with and positively retained between the respective two support surfaces (28a or 28b) stated above, whichever the headrest is at the lower home position or at the upwardly displaced point. This assuredly retains the holder bracket (24) against wobbling or rattling at the guide element (26), thus insuring to prevent dangerous dislocation of the headrest (12) from a given point for receiving and supporting a head of seat occupant at any one of the lower home position and upwardly displaced point.

The embodiment described thus far is just intended for explaining one aspect of the present invention, and therefore, it should be understood that the present invention is not limited to the illustrated embodiment, but any other modification and rearrangement may be applied to the invention without departing from the scopes of the appended claims.

The present invention is generally applied to a headrest connectable with and releasable from a seat back, as described above, but may be applied to a headrest of the type that is not releasable from the seat back, for example.

What is claimed is:

1. A structure of a seat back of a vehicle seat in combination with a headrest, wherein said headrest has a stay portion and is displaceable between a home position where the headrest normally supports a head of a seat occupant on the vehicle seat and an upward displaced point to which the headrest is to be displaced upward from said home position, wherein a pressure receiving element is movably provided in the seat back, wherein a biasing means having a predetermined biasing force is provided, so that said headrest is normally biased by said biasing means to said home position, and wherein, in case of a rear-end collision, upon a load in excess of said predetermined biasing force being applied in a direction back from the seat back of said pressure receiving element under inertia of said seat occupant, the headrest is caused to displace from said home position to said upward displaced point, wherein said seat back has a seat back frame provided therein, said seat back frame comprising:

an upper frame member defined upward from the seat back; and right-side and left-side lateral frame members extending downward from said upper frame member;

wherein a pair of right-side and left-side rotating links, each having a first pivotal point, a second pivotal point, and a third pivotal point, are pivotally connected, at the respective first pivotal points thereof, with said right-side and left-side lateral frame members of said seat back frame, wherein a support shaft is rotatably connected between said second pivotal point of one of said pair of right-side and left-side rotating links and said second point another of said pair of right-side and left-side rotating links, such that rotation of said pair of right-side and left-side rotating links about the respective first pivotal points causes vertical displacement of said support shaft along an arcuate path relative to said first pivotal points, wherein a holder bracket of a cylindrical configuration is integrally provided to said support shaft;

wherein a stay portion of said headrest is inserted and retained in said holder bracket;

wherein a guide element is fixed on said upper frame member of said seat back frame, with such an arrangement that said holder bracket is slidingly movable and inclinable through said guide element, and that, when said pair of right-side and left-side rotating links are rotated due to said load in excess of said predetermined biasing force, said holder bracket is moved through said guide element in a direction upward of said seat back frame, so that said headrest is displaced to said upward displaced point, while being inclined relative to said guide element in a direction forward of said seat back frame;

wherein a cross pressure-receiving element is provided for receiving a load to be applied from a dorsal part of said seat occupant;

wherein a pair of right-side and left-side actuator link assemblies are provided, each being of such a type wherein the body thereof is stretchable and contractible, and having an upper end portion disposed at the upper region of the seat cushion frame;

wherein said cross pressure-receiving element is operatively connected with said pair of right-side and left-side actuator link assemblies;

wherein said upper end portion of each of said pair of right-side and left-side actuator link assemblies is pivotally connected with said third pivotal point associated with each of said pair of right-side and left-side rotating links at a point below said support shaft, with such an arrangement that, upon receiving said load applied from said dorsal part of said seat occupant, said cross pressure-receiving element is forcibly displaced in a direction backwardly of said seat back frame, which causes said pair of right-side and left-side actuator link assemblies to stretch to thereby cause said rotation of said pair of right-side and left-side rotating links to displace said headrest to said upward displaced point, and that, upon arrival of the headrest at the upwardly displaced point, said pair of right-side and left-side support link assembles are stretched to an extent of acting upon said pair of right-side and left-side rotating links so as to retain said headrest at said upward displaced point; and wherein said first and second pivotal points of each of said pair of right-side and left-side rotating links are arranged in such a manner that, when said headrest reaches said upward displaced point, said pair of right-side and left-side rotating links are rotated by an angle of rotation relative to the respective first pivotal points, with the second pivotal points being located at a predetermined position with respect to said angle of rotation, at which time, upon another load being applied in a direction backward from the seat back towards and exerted on said headrest, a corresponding force is transmitted to said second pivotal points respectively of said pair of right-side and left-side rotating links through said headrest, said stay portion, said holder bracket and said support shaft, thus generating a component force of said another load at said second pivotal points, and at the same time, said component force is applied in a direction to said first pivotal points respectively of said pair of right-side and left-side rotating links and blocked thereby, which attempts to retain said second pivotal points at said predetermined position, so that said headrest is retained at said upward displaced point against said predetermined biasing force of said biasing means.

2. The structure of a seat back according to claim 1, wherein a vertical pressure-receiving element is movably provided to said seat back frame, said vertical pressure-receiving element being adapted for receiving a load to be applied at least from a lumbar part of said seat occupant and also having a lower end portion disposed at a lower region of the seat back frame;

wherein said vertical pressure-receiving element is formed by a rod member having an elastic property, said rod member being arranged so as to receive said load to be applied from said dorsal part of said seat occupant, in addition to said load to be applied from said lumber part of the seat occupant;

wherein a guide hole is provided at a lower region of said seat back frame, said guide hole being shaped in such a manner as to slope upward as it proceeds to a side backward from the seat back frame;

wherein said lower end portion of said vertical pressure-receiving element is slidably inserted in said guide hole and also arranged in an interlocking relation with said support staff, so that, upon the load being applied from the lumbar part of said seat occupant to the vertical pressure-receiving element, said lower end portion of the vertical pressure-receiving element is moved along said guide hole in a direction backward of the seat back frame, thereby causing backward and upward displacement of the vertical pressure-receiving element itself to press said support shaft upwardly, which in turn causes commencement of rotation of said pair of right-side and left-side rotating links to thereby cause said headrest to displace from said home position;

wherein said cross pressure-receiving element is extended between said pair of right-side and left-side actuator link assemblies and disposed at a point backward of and spaced apart from said vertical pressure-receiving element, such that, when the load is applied from said dorsal part of said seat occupant toward said cross pressure-receiving element, subsequent to said commencement of rotation of said pair of right-side and left-side rotating links, said vertical pressure-receiving element is resiliently warped toward said cross pressure-receiving element, and then, said particular cross pressure-receiving element receives the thus-warped vertical pressure-receiving element, so that said cross pressure-receiving element is forcibly displaced in a direction backward from said seat back frame, which causes said pair of right-side and left-side actuator link assemblies to stretch to thereby assist in continuation of said rotation of said pair of right-side and left-side rotating links to continue displacement of said headrest to said upward displaced point.

3. The structure of a seat back according to claim 2, wherein a support plate is movably provided between said pair of right-side and left-side actuator link assemblies at a point forward of and distant from said vertical pressure-receiving element, said support plate having an engagement portion adapted for releasable engagement with said engagement portion of said vertical pressure-receiving element, such that, upon receiving said load from said lumbar part, said support plate is moved backward towards said vertical pressure-receiving element, with the engagement portion of the former being brought to engagement with the engagement portion of the latter, and further backward movement of the support plate causes said backward and upward displacement of said vertical pressure receiving element to press said support shaft upwardly.

4. The structure of a seat back according to claim 1, wherein said biasing means comprises an extension coil spring, wherein said extension coil spring is at one end thereof securely connected with each of said pair of right-side and left-side rotating links at a point above a central axis of said support shaft, while being at another end thereof securely connected with a lower region of said seat back frame, said another end extending downward of said seat back frame, so that the extension coil spring is resiliently stretched between said one and another ends thereof, thereby giving said predetermined biasing force to each of said pair of right-side and left-side rotating links;

wherein, when said headrest is at said upward displaced point and both said pair of right-side and left-side rotating links have been rotated by an angle of rotation relative to the respective first pivotal points thereof, a line of force of said extension coil spring is disposed at a point adjacent to and backwardly of said pivotal points of said pair of right-side and left-side rotating links, with respect to said angle of rotation.

5. The structure of a seat back according to claim 1, wherein said guide element has a through-hole formed therein, said through-hole being adapted to allow said holder bracket to be inserted therein, wherein said guide element also has, defined in said through-hole, a forward inner wall facing forward of the seat back and a backward inner wall facing backward of the seat back;

wherein a pair of first support surfaces are defined in said forward and backward inner walls, respectively, so as to be disposed in a spaced-apart and offset manner in relation to said through-hole;

wherein a pair of second support surfaces are defined in said forward and backward inner walls, respectively, so as to be disposed in a spaced-apart and offset manner in relation to said through-hole; and wherein said pair of first support surfaces extend in parallel with each other and are inclined by an angle equal to an angle of inclination assumed by said holder bracket when said headrest is at said home position, whereas on the other hand, said pair of second support surfaces extend in parallel with each other and are inclined by an angle equal to an angle of inclination assumed by said holder bracket when said headrest is at said upward displaced point, thereby allowing said first and second surfaces of said holder bracket to be in contact with the respective said pair of first support surfaces and retained therebetween when said headrest is at said home position, while on the other hand allowing said first and second surfaces of said holder bracket to be in contact with and retained between said pair of second support surface when said headrest is at said upward displaced point.

\* \* \* \* \*